US012062849B2

(12) United States Patent
Lahav

(10) Patent No.: US 12,062,849 B2
(45) Date of Patent: Aug. 13, 2024

(54) SLANTED POLARIZATION ANTENNA

(71) Applicant: QUALCOMM Incorporated, San Diego, CA (US)

(72) Inventor: Gadi Lahav, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/343,346

(22) Filed: Jun. 28, 2023

(65) Prior Publication Data

US 2023/0344135 A1 Oct. 26, 2023

Related U.S. Application Data

(62) Division of application No. 17/204,525, filed on Mar. 17, 2021, now Pat. No. 11,721,907.

(51) Int. Cl.

*H01Q 13/10* (2006.01)
*H01Q 9/20* (2006.01)
*H01Q 21/06* (2006.01)
*H01Q 21/10* (2006.01)

(52) U.S. Cl.

CPC ............... *H01Q 13/10* (2013.01); *H01Q 9/20* (2013.01); *H01Q 21/062* (2013.01); *H01Q 21/064* (2013.01); *H01Q 21/10* (2013.01)

(58) Field of Classification Search

CPC ........ H01Q 13/10; H01Q 9/20; H01Q 21/062; H01Q 21/064; H01Q 21/10
See application file for complete search history.

(56) References Cited

U.S. PATENT DOCUMENTS

2013/0141296 A1 6/2013 Jaffri et al.
2022/0302595 A1 9/2022 Lahav

FOREIGN PATENT DOCUMENTS

JP 2000138528 A * 5/2000

* cited by examiner

*Primary Examiner* — Dieu Hien T Duong
(74) *Attorney, Agent, or Firm* — Sunstein LLP

(57) ABSTRACT

A method of slant-polarization energy transfer includes: at least one of: transmitting a first slanted polarization signal by: transmitting a first component signal of a first polarization from at least one first antenna element; and transmitting a second component signal of a second polarization from at least one second antenna element, the at least one first antenna element and the at least one second antenna element being complementary antenna elements; or receiving a second slanted polarization signal by: receiving a third component signal of the first polarization with the at least one first antenna element; and receiving a fourth component signal of the second polarization with the at least one second antenna element.

4 Claims, 9 Drawing Sheets

SLANTED POLARIZATION ANTENNA

CROSS-REFERENCE TO RELATED APPLICATIONS

This application is a divisional of application Ser. No. 17/204,525, filed Mar. 17, 2021, entitled "SLANTED POLARIZATION ANTENNA," which is assigned to the assignee hereof, and the entire contents of which are hereby incorporated herein by reference for all purposes.

BACKGROUND

Antennas have a wide variety of applications. For example, antennas have long been used for applications such as communications, radar, and navigation (e.g., for receiving satellite signals). As wireless communication devices have increased in use, antennas for communication and positioning have increased in use and variety. For example, mobile telecommunication devices have progressed from simple phones to smart phones with multiple communication capabilities (e.g., multiple cellular communication protocols, Wi-Fi, BLUETOOTH®, and other short-range communication protocols). Further, with autonomous driving on the rise, antenna use for object detection has increased.

With various applications, antennas of various configurations and functionalities have been developed. For example, antennas may provide different polarizations for transmitting and receiving energy. For example, antennas may provide linear polarization, circular polarization, or elliptical polarization. Antennas may include polarization diversity, radiating and/or receiving multiple polarizations of energy. For example, an antenna may have a slant polarization, i.e., a linear polarization that may be a combination of horizontal polarization and vertical polarization with a combined effect of a linear polarization between horizontal and vertical polarization.

SUMMARY

An example antenna system includes: a first sub-system including at least one first antenna element shaped and disposed to have a first electrical polarization, in a first direction, in response to excitation of the first sub-system; and a second sub-system including at least one second antenna element shaped and disposed to have a second electrical polarization, in a second direction, in response to excitation of the second sub-system; where the at least one first antenna element and the at least one second antenna element are complementary antenna elements; and where the first sub-system and the second sub-system are co-located such that first sub-system and the second sub-system in combination provide a slant-polarization for the antenna system.

Implementations of such an antenna system may include one or more of the following features. The first sub-system includes an electrically-conductive plane defining at least one slot, and the at least one first antenna element includes the at least one slot, and the at least one second antenna element includes at least one electric dipole. Each of the at least one electric dipole includes a pair of dipole arms and a pair of energy couplers each electrically coupled to a respective one of the pair of dipole arms, and at least portions of the pair of electric dipole arms of each of the at least one electric dipole at least partially overlaps a respective one of the at least one slot. Each of the at least one electric dipole includes a pair of dipole arms and a pair of energy couplers each electrically coupled to a respective one of the pair of dipole arms, and the at least portions of the pair of electric dipole arms of each of the at least one electric dipole are coplanar with a length of the respective one of the at least one slot. Each of the at least one electric dipole includes a pair of dipole arms and a pair of energy couplers each electrically coupled to a respective one of the pair of dipole arms, and each of the energy couplers is electrically coupled to the electrically-conductive plane. The energy couplers of each of the at least one electric dipole are electrically coupled to the electrically-conductive plane on opposite sides of a respective one of the at least one slot. The energy couplers of each of the at least one electric dipole are electrically coupled to the electrically-conductive plane offset toward one end, from a midpoint of a length, of the respective one of the at least one slot. A first part of each of the electric dipole arms of each of the at least one electric dipole extends at least partially transverse to a length of the respective one of the at least one slot, and a second part of each of the electric dipole arms of each of the at least one electric dipole extends substantially parallel to the respective one of the at least one slot. Each of the at least one electric dipole includes a pair of dipole arms and a pair of energy couplers each electrically coupled to a respective one of the pair of dipole arms, each of the at least one slot has an electrical length of substantially one-half of a first effective wavelength of a corresponding frequency, and each of the dipole arms is disposed substantially one-eighth of a second effective wavelength from the electrically-conductive plane, the second effective wavelength corresponding to the frequency in a substrate disposed between the dipole arms and the electrically-conductive plane. The electrically-conductive plane includes a wall of a substrate-integrated waveguide. The antenna system includes: the substrate-integrated waveguide; and a transition mechanism coupled to the substrate integrated waveguide and having an input/output port sized and shaped to couple to an electromagnetic transmission line that is different from the substrate integrated waveguide, where the transmission mechanism is configured to convey energy between the substrate integrated waveguide and the input/output port.

Another example antenna system includes: first radiating means for radiating first energy in a first linear polarization; second radiating means for radiating second energy in a second linear polarization, the second linear polarization being different from the first linear polarization; and coupling means for coupling the second energy from the first radiating means to the second radiating means to cause the second radiating means to radiate the second energy in the second linear polarization to produce third energy as a combination of the first energy and the second energy, the third energy having a third linear polarization that is different from both the first linear polarization and the second linear polarization.

Implementations of such an antenna system may include one or more of the following features. The first radiating means include an electrical conductor defining a linear array of slots, each of the slots having a length centered along a respective slot centerline that substantially parallel to a linear array centerline of the linear array, the slots being disposed on alternating sides of the centerline, and the second radiating means include electrical dipoles, each electrical dipole being electrically coupled to the electrical conductor on opposite sides of a respective one of the slots. Each of the dipoles includes dipole arms extending along a dipole centerline, each dipole centerline overlapping with the respective one of the slots. Each dipole centerline is disposed at a non-zero angle with respect to the slot centerline of the respective one of the slots.

An example method of slant-polarization energy transfer includes: at least one of: transmitting a first slanted polarization signal by: transmitting a first component signal of a first polarization from at least one first antenna element; and transmitting a second component signal of a second polarization from at least one second antenna element, the at least one first antenna element and the at least one second antenna element being complementary antenna elements; or receiving a second slanted polarization signal by: receiving a third component signal of the first polarization with the at least one first antenna element; and receiving a fourth component signal of the second polarization with the at least one second antenna element.

DETAILED DESCRIPTION

Techniques are discussed herein for providing a slant-polarization energy transmission and/or reception. For example, an antenna may have antenna elements of both horizontal and vertical polarization that may provide a combined slanted polarization (e.g., 45° polarization and possibly other angles of polarization). The antenna may have complementary antenna elements providing the two polarizations, e.g., a magnetic dipole (e.g., a slot) and an electric dipole. The electric dipoles may be disposed to overlap the slots and may be connected to a ground plane of the slots to transfer energy between the ground plane and the dipoles. The dipoles may be connected to the ground plane on opposite sides of the slots, offset from midpoints of the slots toward one end of each slot. Dipole arms for radiating and/or receiving energy may extend from sides of the slots over the slots and overlap the slots along lengths of the slots. Other configurations, however, may be used.

Items and/or techniques described herein may provide one or more of the following capabilities, as well as other capabilities not mentioned. Detection of objects of various orientations may be facilitated. Slant polarization energy transmission and/or reception may be provided with low loss, e.g., for mm-wave energy. Antenna systems with few elements (e.g., 6×8 element arrays), high gain (e.g., above 5 dBi), wide beam width (e.g., above 90°), and/or low loss (e.g., reduced transmission line transitions) may be provided, e.g., for antennas for use with signal frequencies over 70 GHz although other signal frequencies may be used. By supplying energy to two different types of antenna elements from a single waveguide, a transition between waveguide and another transmission line (e.g., stripline, microstrip) may be avoided, and thus loss inherent in such a transition avoided. For example, by feeding a substrate-integrated-waveguide-based antenna element directly, a transmission line transition is avoided. Other capabilities may be provided and not every implementation according to the disclosure must provide any, let alone all, of the capabilities discussed.

Figure 1:
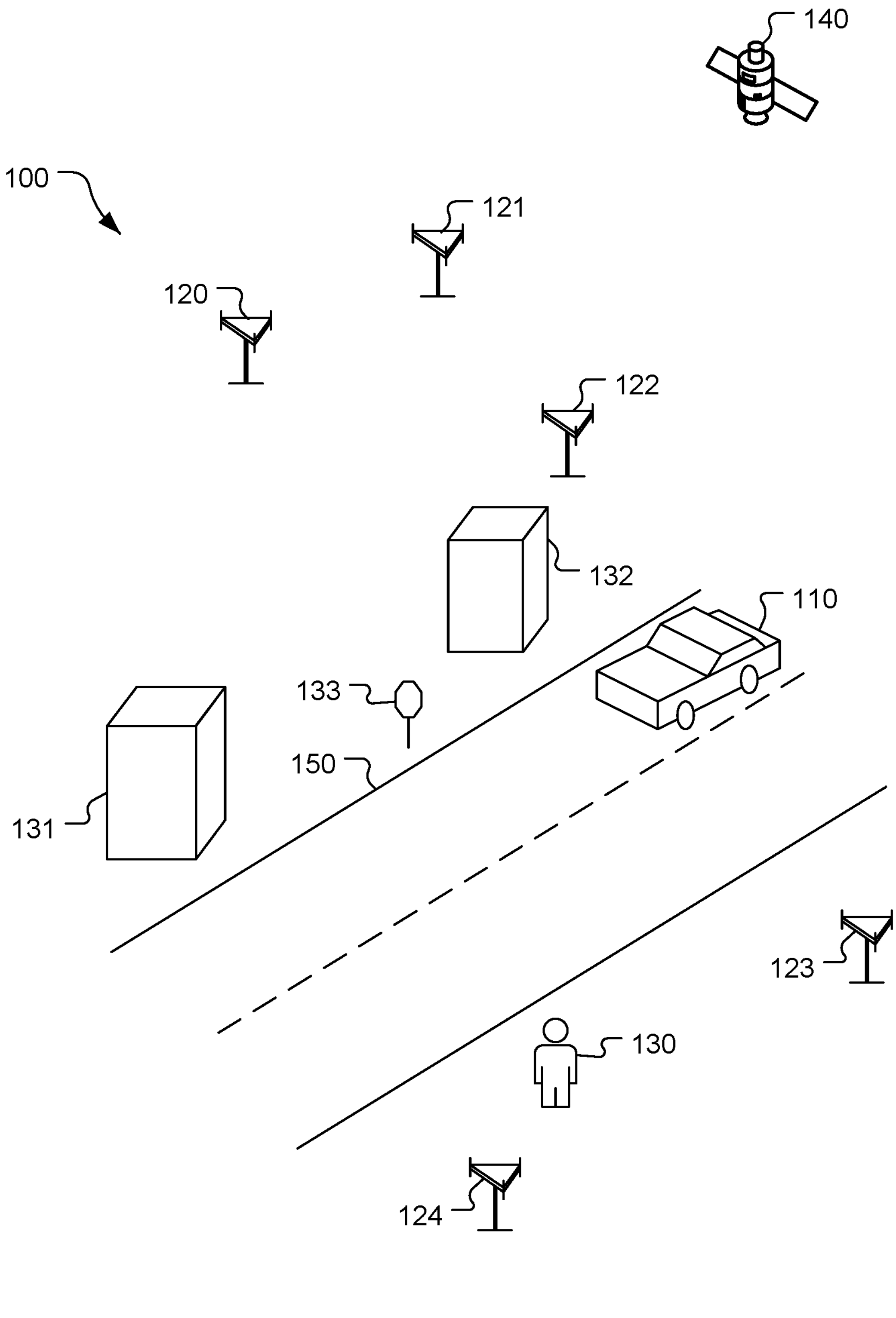
FIG. 1 is a simplified diagram of an example environment for apparatus employing one or more slant-polarization antennas.

Referring to FIG. 1, an environment 100 includes an apparatus 110, communication base stations 120, 121, 122, 123, 124, and objects 130, 131, 132, 133, and a satellite vehicle (SV) 140. The apparatus 110, in this example a vehicle, includes at least one antenna as discussed further below and is traveling on a road 150. The vehicle is just one example of an apparatus that may include one or more antennas as discussed herein, e.g., as most obstacles in automotive applications are either horizontal or vertical. Other examples of apparatus may be used, e.g., unoccupied aerial vehicles (UAVs), airplanes, user equipments (UEs) (such as smartphones, tablet computers, etc.), and other potentially-mobile devices, transceivers, low-loss applications using SIW transmission lines, etc. Such apparatus may also include stationary or typically-stationary apparatus such as buildings, signs, appliances, etc. There are many potential applications for antennas discussed herein including, but not limited to, radar and telecommunications whether for military or commercial applications. The communication base stations 120-124 are shown as cellular base stations, but other forms of base stations may be used, such as Wi-Fi base stations, BLUETOOTH® base stations, picocells, femtocells, etc. The objects 130-133, in this example, are a person, two buildings, and a stop sign. Other quantities of objects may be present and other forms of objects (e.g., trees, benches, other vehicles, terrain features, etc.) may be present. Further, although only one SV is shown in the environment 100, more than one SV may be present. The environment 100 is a simple example of an environment in which antennas as discussed herein may find applicability.

Figure 2:
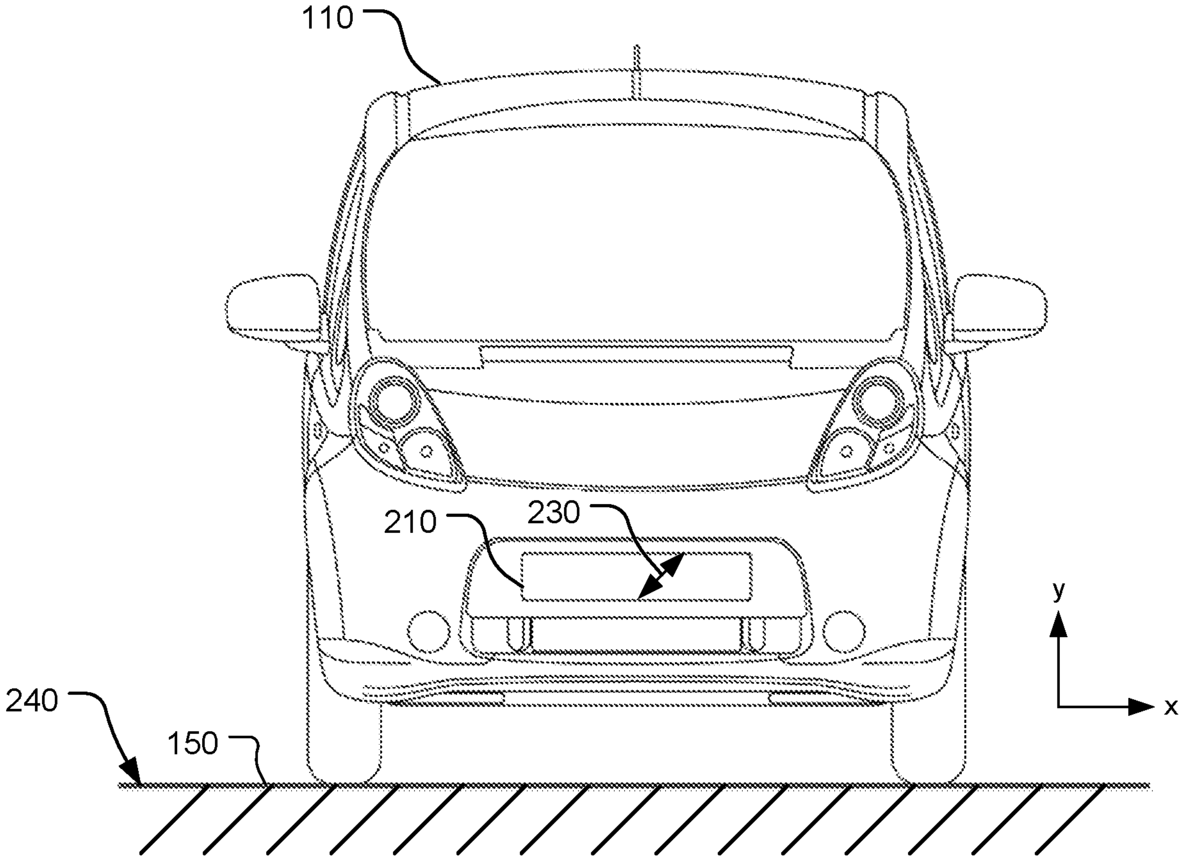
FIG. 2 is a front plan view of a vehicle shown in FIG. 1.

Referring also to FIG. 2, the apparatus 110 may include an antenna system 210 that includes an antenna configured to have a slant polarization 230. For example, the slant polarization 230 may be about 45° (e.g., 45°+/−2°) relative to a horizontal polarization (which, in this example, is an x-direction parallel with a surface 240 of the road 150) and relative to a vertical polarization (which, in this example, is a y-direction perpendicular to the surface 240). The slant angle of 45° is an example only, and the antenna system 210 may be configured to provide other angles of polarization, for example as discussed further below.

Figure 3:
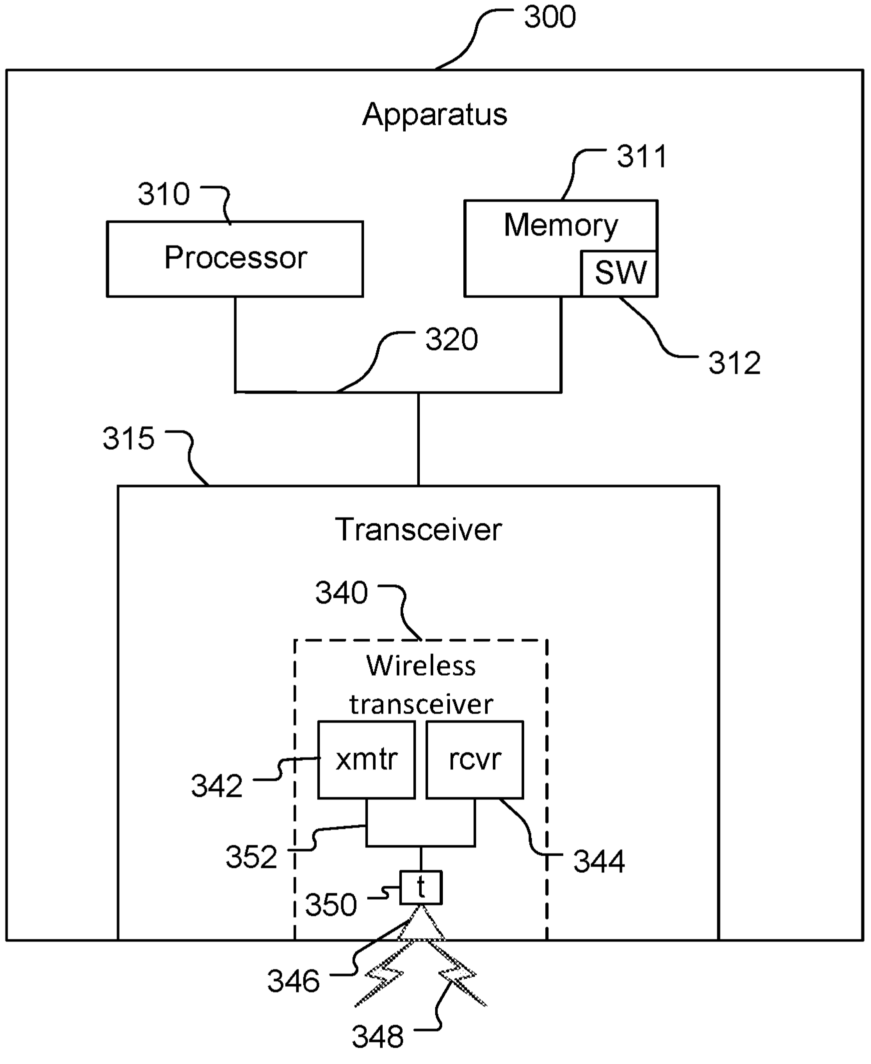
FIG. 3 is a block diagram of components of an example apparatus including a slant-polarization antenna.

Referring also to FIG. 3, an apparatus 300 is an example of the antenna system 210 and comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown components of the apparatus 300 may be omitted from the apparatus 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP (digital signal processor), a modem processor, a video processor, and/or a sensor processor). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to send signals to an antenna and/or process signals from an antenna. Alternatively, the software 312 may not be directly executable by the processor 310 but may be configured to cause the processor 310, e.g., when compiled and executed, to perform the functions. The processor 310 may include a memory with stored instructions in addition to and/or instead of the memory 311.

The transceiver 315 may include a wireless transceiver 340 configured to communicate with other devices through wireless connections. For example, the wireless transceiver 340 may include a transmitter 342 and receiver 344 coupled to one or more antennas 346 for transducing signals (e.g., electrical signals, optical signals, electromagnetic signals from the transmitter 342 and transmitting corresponding wireless signal 348 and/or receiving the wireless signals 348 and transducing signals from the wireless signals 348 to wired (e.g., electrical and/or optical) signals that are provided to the receiver 344. Thus, the transmitter 342 may include multiple transmitters that may be discrete components or combined/integrated components, and/or the receiver 344 may include multiple receivers that may be discrete components or combined/integrated components. The transceiver 315 may also include a wired transceiver although the wired transceiver is not shown in FIG. 3.

The transceiver 315 includes a transition mechanism 350. The transition mechanism 350 may be part of or connected to the antenna 346. The transition mechanism 350 is connected to a transmission line 352 that is connected to the transmitter 342 and the receiver 344. The transition mechanism 350 is configured to transition between a form of the transmission line 352 and a form of a transmission line of the antenna 346. For example, the transmission line 352 may comprise a stripline, a microstrip line, a coaxial cable, etc. and the antenna 346 may comprise a different form of transmission line for transferring energy between antenna elements of the antenna 346 and the transition mechanism 350. For example, the antenna 346 may comprise a waveguide transmission line such as metal (e.g., vacuum-sealed) waveguide or a substrate integrated waveguide (SIW) and the transition mechanism 350 may be a bottom or a top wall of the SIW that tapers to a size (e.g., width) and shape of a microstrip line to provide an input/output port. The transition mechanism can convey energy between the antenna 346, e.g., between the SIW, and the input/output port. SIWs are relatively low-loss transmission lines and thus may be used for high-frequency applications such as applications using signals with frequencies above 2 GHz, such as above 6 GHz, above 20 GHz, above 50 GHz, above 75 GHz, etc.

Figure 4:
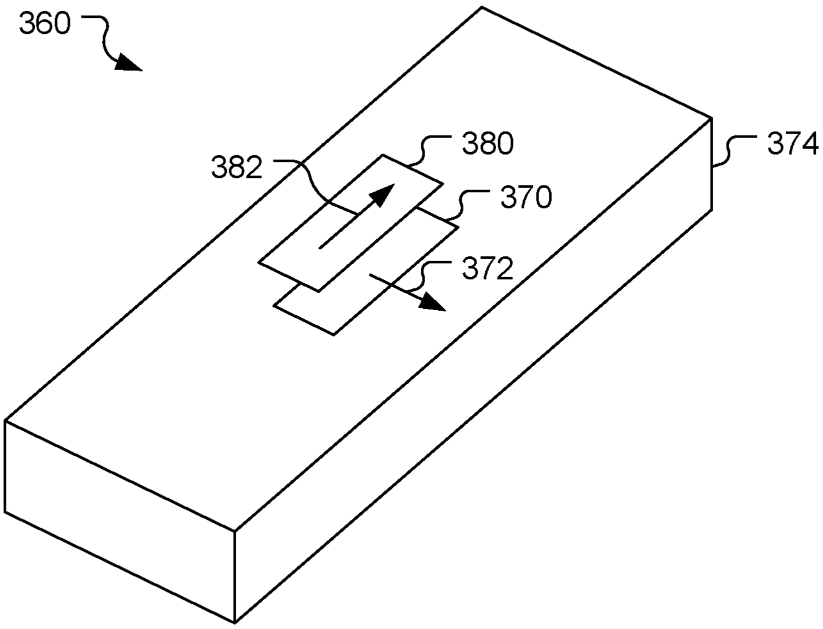
FIG. 4 is a perspective view of the slant-polarization antenna shown in FIG. 3.

Referring also to FIG. 4, an antenna system 360 is an example of the antenna 346 and includes antenna sub-systems 370, 380 configured to provide different polarizations 372, 382. Each of the sub-systems 370, 380 comprises one or more antenna elements. The sub-system 370 may be disposed on, or defined by, an antenna body 374, e.g., a part of a printed circuit board (PCB). The sub-system 380 may be disposed in a different layer of the antenna body 374, although a portion of the body 374 between the sub-systems 370, 380 is not shown in FIG. 4. The antenna elements of the sub-systems 370, 380 are complementary, with the antenna elements of the sub-systems 370, 380 being configured and disposed (e.g., oriented relative to each other) to provide orthogonal electrical polarizations 372, 382. The sub-systems 370, 380 are co-located, being disposed close enough to each other, to combine the respective polarizations to provide a combined, slant polarization for the antenna system 360. In the example shown, the sub-systems 370, 380 are overlapping, here with a projection of the sub-system 370 perpendicular to layers of the antenna body 374 intersecting with the sub-system 380. For example, each antenna element of the sub-system 370 may overlap with a respective antenna element of the sub-system 380. The sub-systems 370, 380 may include multiple antenna elements each, for example, each comprising a linear array of respective antenna elements. Two-dimensional arrays of antenna elements may also be used.

Figure 5:
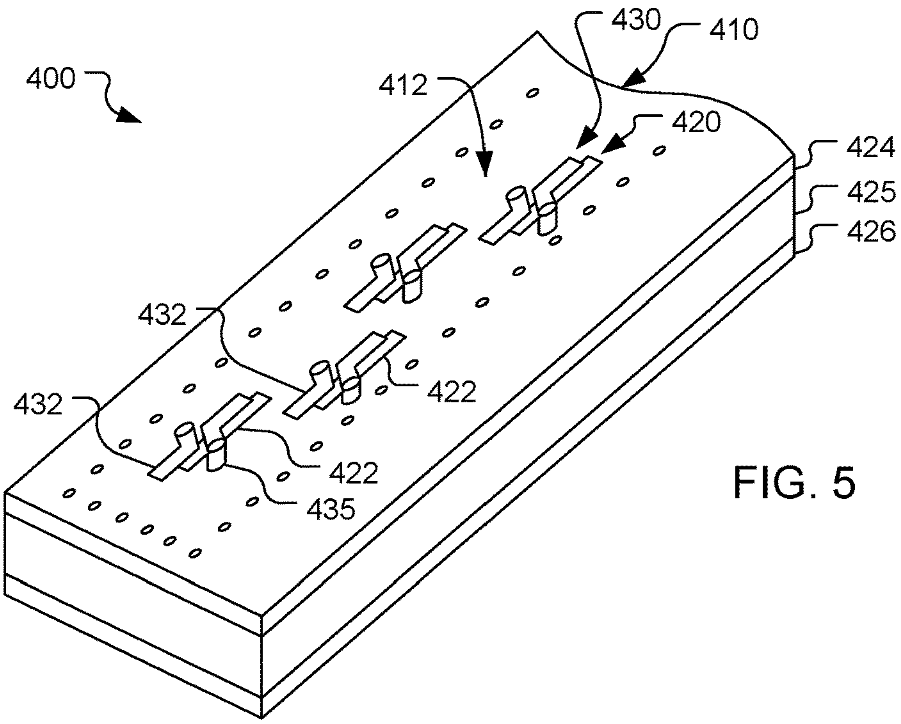
FIG. 5 is a perspective view of a portion of another example of the slant-polarization antenna shown in FIG. 3.
Figure 6:
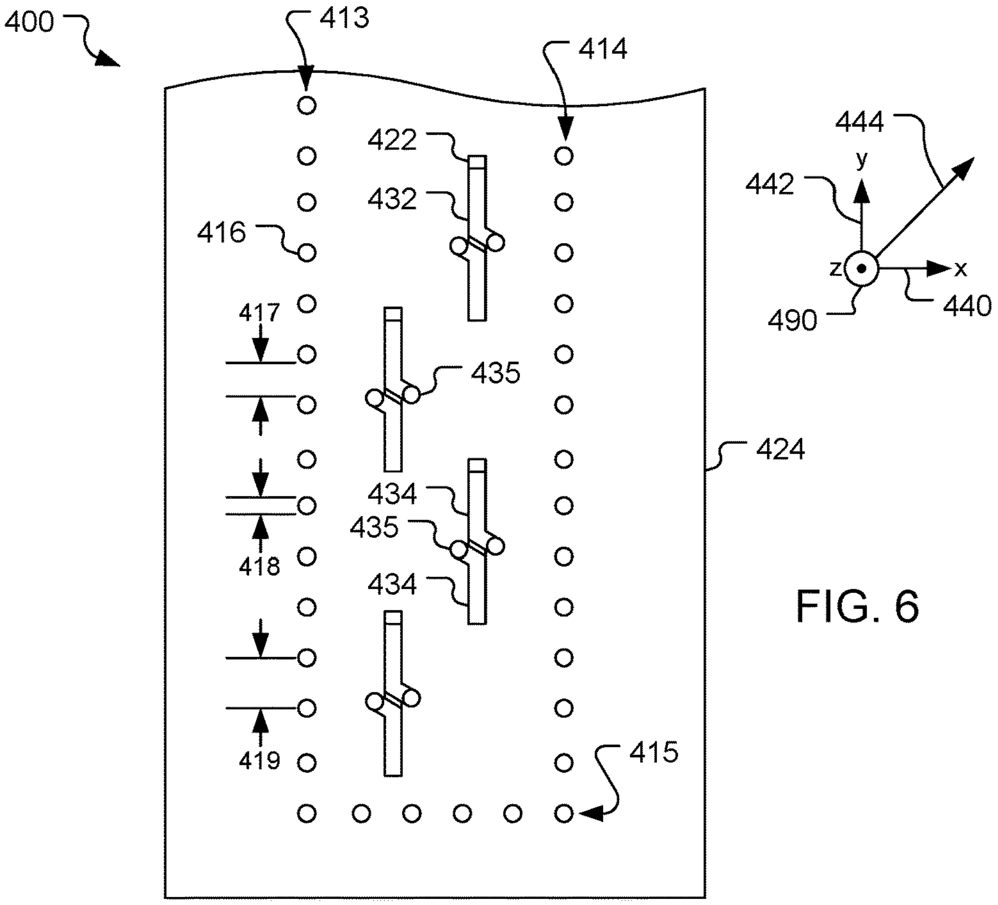
FIG. 6 is a top view of the portion of the antenna shown in FIG. 5.
Figure 7:
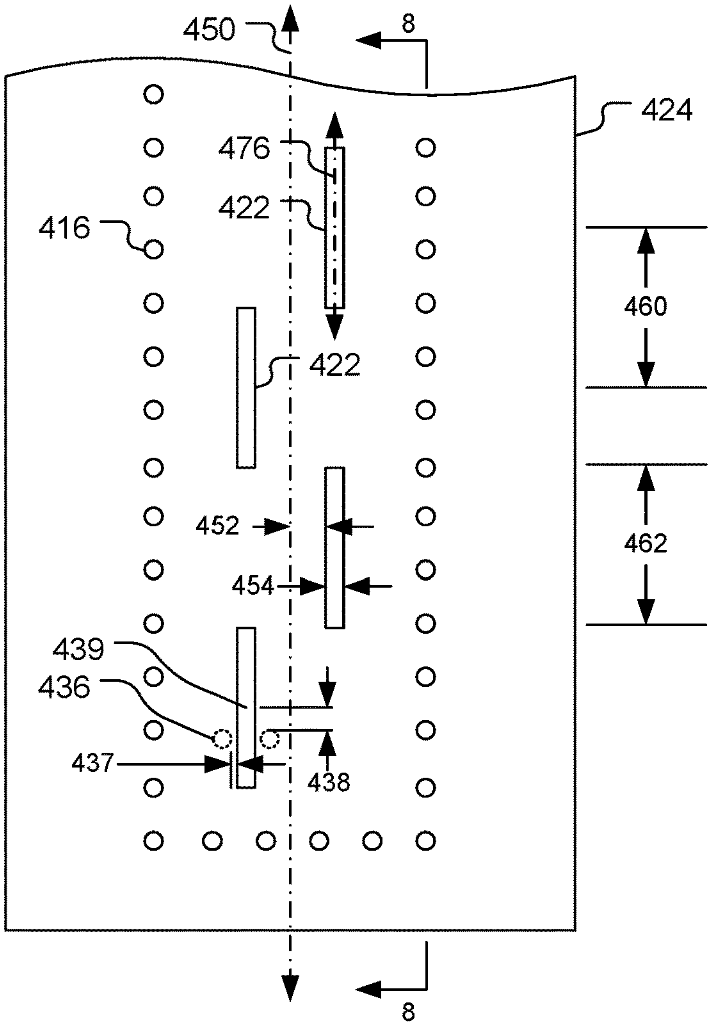
FIG. 7 is the top view of the portion of the antenna shown in FIG. 5 with dipoles of the antenna not shown.

Referring to FIGS. 5-7, with further reference to FIGS. 1-4, an antenna 400 is an example of the antenna 346 (and an implementation of the antenna system 360 with more than one antenna element) and includes a transmission line 410, a first linear array 420 of first antenna elements 422 and a second linear array 430 of second antenna elements 432. The antenna 400 includes a single transmission line 410 connected and configured for transferring energy between the transmission line 410 and multiple arrays of antenna elements, e.g., disparate types of antenna elements and different polarizations of antenna elements. The antenna 400 may be formed by depositing multiple layers of materials selectively, e.g., in selective locations, e.g., using printed circuit board (PCB) fabrication techniques. The first and second antenna elements 422, 432 are dual antenna elements that are complementary in polarity, with electrical and magnetic polarizations of the first antenna elements 422 being aligned with magnetic and electrical polarizations of the second antenna elements 432, respectively. In this example, the antenna elements 422 are rectangularly-shaped and the antenna elements are nearly rectangularly shaped and oriented similarly to the antenna elements 422, but with the antenna elements 422, 432 have orthogonal electrical polarizations. Here, the first antenna elements 422 are slots defined by a conductive layer 424 of the transmission line 410, here a substrate integrated waveguide (SIW), and thus magnetic dipoles, and the second antenna elements 432 are electric dipoles. The conductive layer 424 is an electrically-conductive plane (i.e., having a substantially planar surface) defining the slots 422. In FIG. 7, the dipoles 432 are not shown in order to facilitate viewing of the slots 422. The first antenna elements 422, here slots, are configured to provide horizontal (electrical) polarization, parallel to an x-axis 440 shown in FIG. 6, and the second antenna elements 432, here electrical dipoles (referred to herein as dipoles), are configured to provide vertical (electrical) polarization, parallel to a y-axis 442 shown in FIG. 6.

The combination of the linear arrays 420, 430 (and indeed each dual antenna element pair, i.e., combination of an element 422 and an element 432) is configured to provide slanted polarization, e.g., parallel to a slanted axis 444 that is 45° from both of the axes 440, 442. The slanted polarization may, however, be at other angles relative to the axes 440, 442. The energy radiated (or received) by the slots 422 is approximately in phase (e.g., within $\lambda/8$ of being in phase)

with the energy radiated (or received) by the dipoles 432 due to the coupling of the dipoles 432 to the conductive layer 424 and the separation of dipole arms from the conductive layer 424 (discussed further below).

The transmission line 410, here an SIW, includes a top wall 412, side walls 413, 414, and an end wall 415. The transmission line 410 may not have another end wall, instead transitioning to another form of transmission line, e.g., a microstrip line, a stripline, etc. The side walls 413, 414 and the end wall 415 comprise respective rows of conductive vias 416. The conductive vias are sized and spaced to attempt to make the side walls 413, 414 and the end wall 415 behave like solid walls. For example, a spacing 417 between the conductive vias 416 may be as close as possible within manufacturing capabilities. The spacing 417 may be less than an eighth of a wavelength in a substrate 427 (see FIG. 8) at a reference frequency. The spacing 417 may be about two to four times a diameter 418 of the conductive vias. For example, using LTCC (Low Temperature Cofired Ceramic) technology, the diameter 418 may be about 100 μm to about 200 μm and the spacing 417 may be about 400 μm. The conductive vias 416 are metal posts extending through a substrate 425 (which may comprise one or more layers of material) and are electrically connected to the conductive layer 424 and to a conductive layer 426. The conductive vias 416 may be formed by etching holes in one or more layers of the antenna 400 above the conductive layer 426 and filling the holes with conductive material, then depositing the conductive layer 424. To simplify FIG. 5, the conductive vias 416 are not shown extending through the substrate 425. The top wall 412 of the SIW 410 is a portion of the conductive layer 424 between the side walls 413, 414 and bounded by the end wall 415. Similarly, a bottom wall (not shown) of the SIW 410 is a portion of the conductive layer 426 between the side walls 413, 414 and bounded by the end wall 415.

Figure 8:
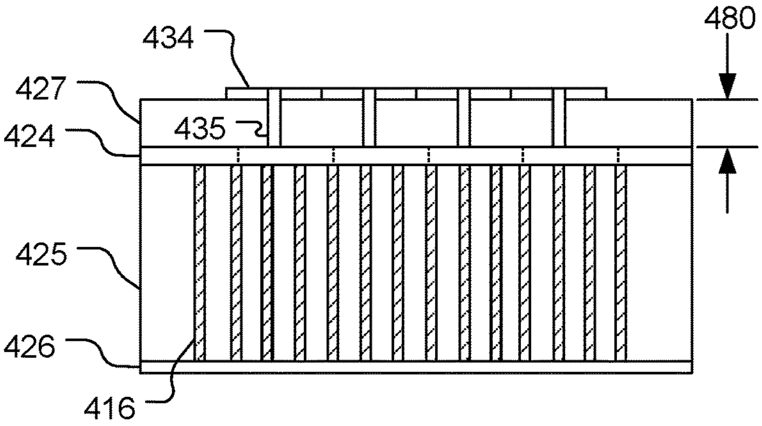
FIG. 8 is a cross-sectional view of the portion of the antenna shown in FIG. 7, cut along line 8-8, and with dipoles shown.

Referring also to FIG. 8, with particular reference to FIG. 7, the slots 422 are configured (e.g., sized and disposed) to provide a linear array of radiators for a traveling wave. The slots 422 are disposed on alternating sides of a centerline 450 of the SIW 410. Distances (separations) 452 of the slots from the centerline 450 may vary to provide a desired antenna pattern because the distances 452 affect amounts of energy radiated from the SIW 410 and/or transferred into the SIW 410. Widths 454 of the slots 422 may be varied to affect a bandwidth provided by the linear array 420 (or a two-dimensional array of the slots 422, e.g., multiple ones of the linear array 420 disposed adjacent to each other). For example, the slots 422 may get wider (e.g., linearly or logarithmically) going from a midpoint of the length of the linear array 420 towards ends of the linear array 420 to widen a bandwidth of the linear array 420. The slots 422 are disposed with center-to-center, inter-element spacings 460 along a length of the SIW 410 of about half of an effective wavelength (e.g., $0.5\lambda_{eff}$+/−$0.05\lambda_{eff}$) for a reference frequency corresponding to an effective dielectric constant. The effective dielectric constant is a combination of the dielectric constant of the substrate 425 and a dielectric constant of a substrate 427 disposed between the conductive layer 424 and the dipoles 432, as shown in FIG. 8. The substrate 427 may have a dielectric constant near one. The substrate 427 is not shown in FIG. 5 for the sake of simplicity of the figure. The slots 422 also have electrical lengths 462 of substantially one-half of the effective wavelength (e.g., $0.5\lambda_{eff}$+/−$0.05\lambda_{eff}$).

The dipoles 432 include pairs of dipole arms 434 and pairs of energy couplers 435. Each of the arms 434 is electrically connected to the conductive layer 424 by a respective one of the energy couplers 435. The energy couplers 435 may be electrically-conductive (e.g., metallic) vias extending through the substrate 427 from the arms 434 to the conductive layer 424. The energy couplers 435 are configured, e.g., sized, shaped, disposed, and connected to appropriate locations of the conductive layer 424, to convey energy between the arms 434 and the conductive layer 424, thus galvanically coupling the dipoles 432 and the slots 422. For example, with the SIW 410 conveying energy, a current distribution in the conductive layer 424 about the slots 422 will have a null at midpoints of the slots 422 along lengths of the slots 422. Each pair of the energy couplers 435 may be connected to the conductive layer 424 on opposite sides of, and adjacent to, a respective slot 422 offset along a length of the slot 422 from a midpoint 439 of the slot 422 toward an end of the slot 422 such that with the SIW 410 conducting energy, the energy couplers 435 are connected to the conductive layer 424 at portions of the conductive layer 424 with non-zero current. For example, the energy couplers 435 may be connected to the conductive layer 424 at contact points 436 (two of which are shown in FIG. 7) that are displaced from the respective slot 422 by a distance 437, such as $0.1\lambda_{eff}$ or less, and displaced from a midpoint of the respective slot 422 by a distance 438, such as $0.1\lambda_{eff}$-$0.2\lambda_{eff}$. The distance 437 may be as small as $0\lambda_{eff}$, with the energy couplers 435 abutting the slots 422. The offset distance 438 may be the same for both of the energy couplers 435 in a pair, and thus only one energy coupler 435 is shown for each dipole 432 in FIG. 8. The top wall 412 of the SIW 410 may thus provide a portion of the SIW 410 and thus a portion of the feed for the slots 422, and a portion of a feed mechanism for the dipoles 432. By using the SIW 410 as part of energy couplers for both of the linear arrays 420, 430, the antenna 400 may reduce the number of transitions from the transmission line 352 to the linear arrays 420, 430, and thus reduce energy lost due to transmission line transitions. For example, a transition from an integrated circuit chip to a waveguide may incur a loss of about 0.25 dB.

The antenna elements 422, 432 may be referred to as "radiators" although the antenna elements 422, 432 may radiate energy and/or receive energy. The energy couplers may be referred to as "feeds," but an energy coupler may convey energy to a radiator from a front-end circuit, or may convey energy from a radiator to the front-end circuit. The energy couplers shown are conductively connected to radiators, but in alternative configurations may be physically separate from the radiators and configured (e.g., sized, shaped, and disposed) to reactively (capacitively and/or inductively) couple energy to or from the radiators.

The sub-systems 370, 380, e.g., the linear arrays 420, 430, may comprise radiating means and one or more of the energy couplers 435 may comprise coupling means. For example, the linear array 420 and the transmission line 410, or at least the top wall 412 of the transmission line 410, may comprise first radiating means for radiating first energy in a first linear polarization. The linear array 430 may comprise second radiating means for radiating second energy in a second linear polarization. The energy couplers 435 may comprise means for coupling the second energy from the first radiating means, e.g., from the transmission line 410, to the second radiating means. The first and second polarizations may be different, and the first and second radiating means may be configured to radiate energy in phase such that first and second energy combine into third energy with a third linear polarization different from both of the first and second linear polarizations.

Figure 9:
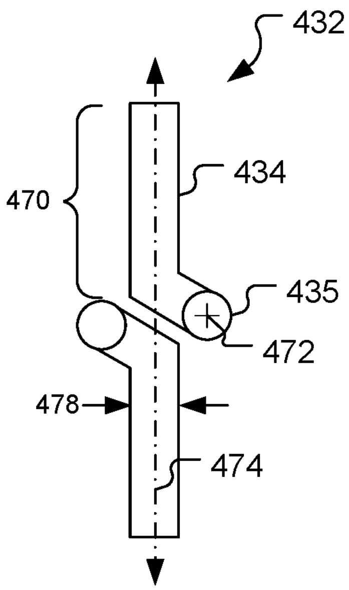
FIG. 9 is a top plan view of a dipole of the antenna shown in FIG. 5.

Referring also to FIG. 9, the energy couplers 435 are offset from the dipole arms 434, at least from colinear portions 470 of the dipole arms 434, i.e., portions of each of pair of the arms 434 that are colinear. That is, the energy couplers 435 are offset from (have centers 472 that do not lie along) a line 474 through longitudinal axes of the colinear portions 470 of the arms 434.

Figure 10:
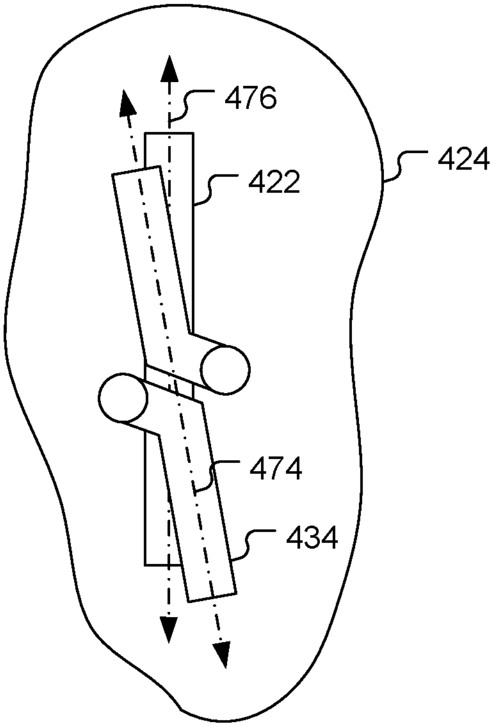
FIG. 10 is a top plan view of a dipole a slot tilted with respect to lengths of the dipole and the slot.

In the example antenna 400, the dipole arms 434 overlap the respective slots 422, with projections of the dipole arms 434 perpendicular to the conductive layer 424 (i.e., along a z-axis 490) intersecting with the slots 422. In this example, widths 478 of the dipole arms 434 are about the same as the widths 454 of the respective slots 422. Lengths of the dipoles 432 are about the same as the lengths 462 of the slots 422. Due to the offset distance 438, one end of each of the dipoles 432 does not extend to the respective end of the respective slot (and thus leaves some of the respective slot 422 exposed (i.e., not overlapped)) as best shown in FIG. 6, while the other end of each of the dipoles 432 overhangs (extends beyond) the other end of the respective slot 422, as best shown in FIG. 8. The dipole arms 434 may have widths and/or lengths that differ from the widths 454 and/or the lengths 462, respectively, of the slots 422. Further, lengths of the dipoles 432 may be tilted relative to lengths of the slots 422, such that the line 474 along the longitudinal axes of the colinear portions 470 of the dipole arms 434 is angled (i.e., has a non-zero angle) with respect to a longitudinal axis 476 (FIG. 6) of the respective slot 422, e.g., as shown in FIG. 10.

The linear arrays 420, 430 at least partially overlap, here with the colinear portions 470 of the dipole arms 434 partially overlapping the respective slots 422 and partially overhanging the respective slots 422. The colinear portions 470 of the dipole arms 434 may be substantially parallel to the slots 422 (e.g., with the line 474 being within +/−10° of the longitudinal axis 476 of the respective slot 422). The dipole arms 434 of the linear array 430 are displaced with respect to the linear array 420 by a distance 480 (see FIG. 8) corresponding to the thickness of the substrate 427. The distance 480 may be substantially ⅛ $\lambda_s$ (e.g., ⅛ $\lambda_s$+/−30%, e.g., $0.08\lambda_s$–$0.17\lambda_s$), with $\lambda_s$ being the wavelength at the reference frequency in the substrate 427. From the perspective of FIG. 8, the dipole arms 434 are disposed above the conductive layer 424 by about ⅛ $\lambda_s$, with the conductive layer 424 potentially serving as a ground plane for the dipoles 432. The separation distance of about ⅛ of a wavelength provided unexpectedly good simulation results, e.g., as discussed below.

Figure 11:
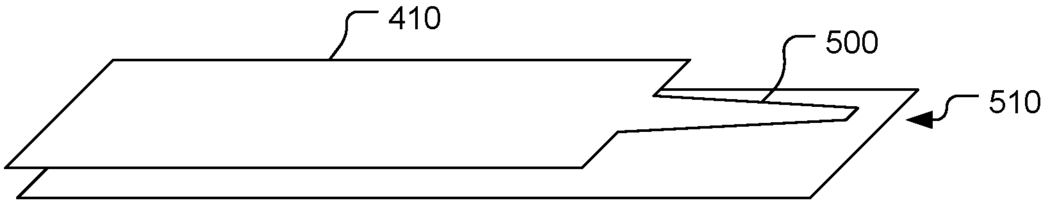
FIG. 11 is a perspective view of a transmission line of the antenna shown in FIG. 5 and an example of a transition mechanism shown in FIG. 3.

The antenna 400 may be connected to a transition to a different type of transmission line that connects to one or more other components of a transceiver in addition to the antenna 400. For example, referring also to FIG. 11, the transmission line 410 may comprise a waveguide transmission line such as a substrate integrated waveguide (SIW), shown in FIG. 11 without vias forming walls of the SIW for simplicity of the figure, and the transition mechanism 350 may be a tapered section 500 extending from the top wall 412 of the SIW 410. The tapered section 500 tapers to a size (e.g., width) and shape of a microstrip line to provide an input/output port 510.

Various antenna configurations may be used, e.g., depending upon desired performance. For example, various numbers of layers and/or various layer thicknesses of the substrate 427 disposed between the dipole arms 434 and the conductive layer 424, and thus the slots 422, may be used. As another example, the lengths 462 of the slots 422 and/or the lengths of the dipoles 432 and/or the offset distances 438 of connection points of the energy couplers 435 relative to the slots 422 and/or the spacing distance 480 separating the dipole arms 434 from the conductive layer 424 (relative ground) may be adjusted (e.g., alone or in any combination) to affect performance of the antenna 400. It has been found, however, that the smaller the offset distance 437 of the contact points 436 of the energy couplers 435 from the slot 422 is, the larger should be the offset distance 438 of the contact points 436 of the energy couplers 435 from the midpoint 439 of the slots 422. Smaller contact points 436 may move the load closer to open circuit, such that driving the contact points 436 further from the slot midpoints 439 may better match the antenna load. As another example, dipole configurations other than those shown may be used, e.g., with dipole arms having widths in the z-axis 490 shown in FIG. 6 and thicknesses in the x-axis 440 being smaller than the widths. As another example, different dipole orientations and/or dipole lengths may be used, which may yield different directions of the slant polarization. As another example, various quantities of slots and dipoles may be used to achieve different antenna pattern characteristics. As another example, two-dimensional arrays of the linear arrays 420, 430 may be used, e.g., with multiple ones of the antenna 400 disposed adjacent to each other in the direction of the x-axis 440. As another example, slot widths may increase, e.g., linearly or logarithmically, across the linear array 420 to increase bandwidth. As another example, the transmission line 410 may take another form (i.e., other than an SIW). As another example, with an SIW as the transmission line 410, the SIW may be printed on more than one layer of a PCB. As another example, arms of the dipoles could be non-colinear (e.g., extending alongside, but not overlapping, the slots 422), and this may cause a shift in a main beam of the antenna pattern. Still other examples are possible.

Operation

Figure 12:
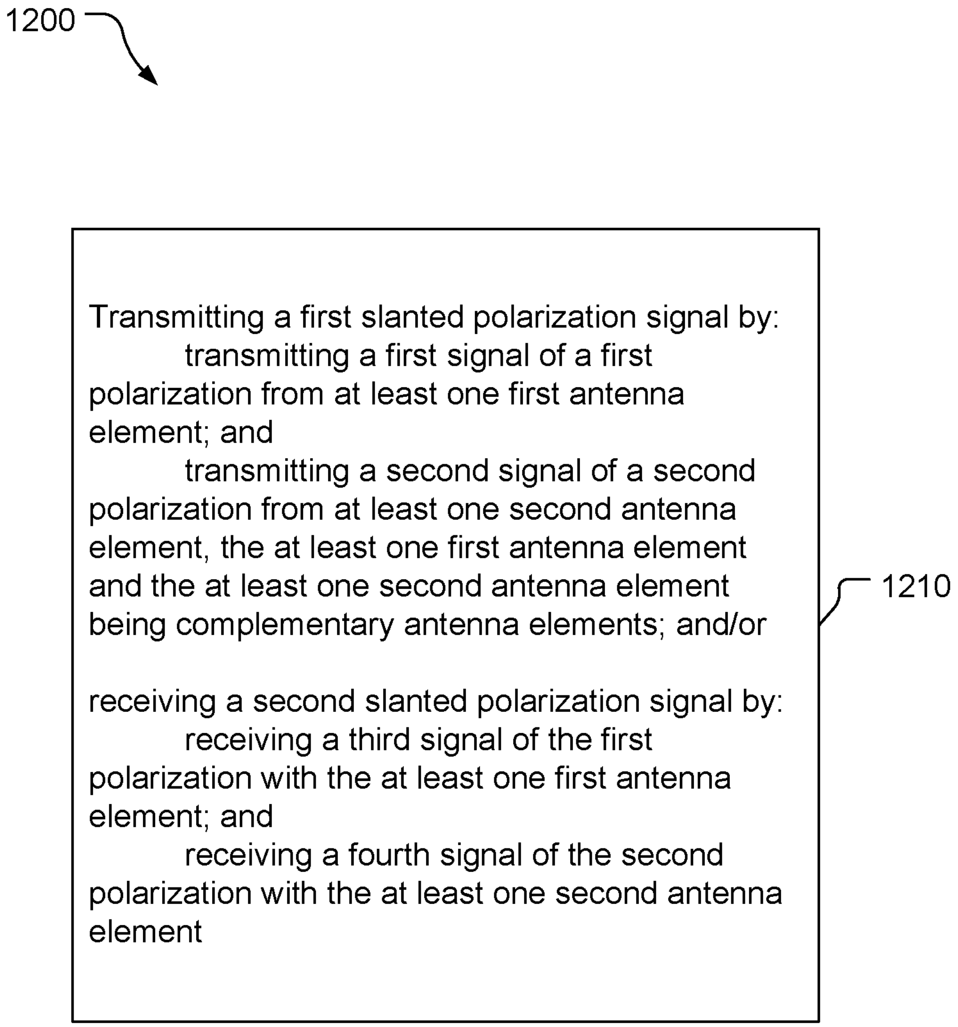
FIG. 12 is a block flow diagram of a method of slant-polarized energy transfer.

Referring to FIG. 12, with further reference to FIGS. 1-11, a method 1200 of slant-polarized energy transfer includes the stages shown. The method 1200 is, however, an example only and not limiting. The method 1200 may be altered, e.g., by having stages added and/or one or more stages split into multiple stages.

At stage 1210, the method 1200 includes transmitting a first slanted polarization signal and/or receiving a second slanted polarization signal. The first slanted polarization signal may be transmitted by: transmitting a first component signal of a first polarization from at least one first antenna element; and transmitting a second component signal of a second polarization from at least one second antenna element, the at least one first antenna element and the at least one second antenna element being complementary antenna elements. For example, respective signals may be transmitted via the sub-systems 370, 380, e.g., the linear arrays 420, 430, and in particular the slots 422, and the dipoles 432. The linear array 420 and possibly the transition mechanism 350, the transmitter 342, and the processor 310 may comprise means for transmitting the first component signal and the linear array 430 and possibly the transition mechanism 350, the transmitter 342, and the processor 310 may comprise means for transmitting the second component signal.

The second slanted polarization signal may be received by: receiving a third signal of the first polarization with the at least one first antenna element; and receiving a fourth signal of the second polarization with the at least one second antenna element. For example, respective signals may be received via the sub-systems 370, 380, e.g., the linear arrays 420, 430 and in particular the slots 422, and the dipoles 432. The linear array 420 and possibly the transition mechanism 350, the receiver 344, and the processor 310 may comprise means for receiving the third component signal and the linear array 430 and possibly the transition mechanism 350, the receiver 344, and the processor 310 may comprise means for receiving the fourth component signal.

Simulations

Various computer simulations of configurations of the antenna 400 and two-dimensional arrays of the antenna 400 have been performed. A simulation of the antenna with six slots and six dipoles yielded co-pol elevation and azimuthal main beam gains of 9.9 dBi, and 3 dB beam widths of about 27° and about 102°, respectively, and with cross-pol patterns with gains of −2 dBi or lower. A reflection coefficient of less than −10 dB was achieved over about 76 GHz to about 81 GHz. A two-dimensional array of the antenna 400, with six slots 422 and six dipoles 432 in the linear arrays 420, 430, and eight of the antennas 400 disposed adjacent to each other (i.e., in the azimuthal direction transverse to lengths of the linear arrays 420, 430) yielded simulated results of about 18 dBi gain for co-pol elevation and azimuthal main beams, 3 dB beam widths of about 30° and 15°, respectively, and with cross-pol patterns with gains of −2 dBi or lower. As with the one-dimensional array, a reflection coefficient of less than −10 dB was achieved over about 76 GHz to about 81 GHz. The results of the simulations were unexpectedly good in view of the dipoles 432 being disposed in the presence of the conductive layer 424, and especially in view of the dipoles 432 being disposed in close proximity to (e.g., less than one-quarter of a wavelength in the substrate 427 from) the conductive layer 424, the energy couplers 435 being connected to the conductive layer in close proximity to the slots 422, the conductive vias 416 having diameters 418 of about 100 μm, and a center-to-center pitch 419 being about 500 μm such that the spacings 417 were about 400 μm (almost a quarter of a wavelength).

Other Considerations

Other examples and implementations are within the scope of the disclosure and appended claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.).

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner.

Having described several example configurations, various modifications, alternative constructions, and equivalents may be used. For example, the above elements may be components of a larger system, wherein other rules may take precedence over or otherwise modify the application of the invention.

The invention claimed is:

1. An antenna system comprising:

first radiating means for radiating first energy in a first linear polarization;

second radiating means for radiating second energy in a second linear polarization, the second linear polarization being different from the first linear polarization; and coupling means for coupling the second energy from the first radiating means to the second radiating means to cause the second radiating means to radiate the second energy in the second linear polarization to produce third energy as a combination of the first energy and the second energy, the third energy having a third linear polarization that is different from both the first linear polarization and the second linear polarization.

2. The antenna system of claim 1, wherein the first radiating means comprise an electrical conductor defining a linear array of slots, each of the slots having a length centered along a respective slot centerline that substantially parallel to a linear array centerline of the linear array, the slots being disposed on alternating sides of the centerline, and wherein the second radiating means comprise electrical dipoles, each electrical dipole being electrically coupled to the electrical conductor on opposite sides of a respective one of the slots.

3. The antenna system of claim 2, wherein each of the dipoles comprises dipole arms extending along a dipole centerline, each dipole centerline overlapping with the respective one of the slots.

4. The antenna system of claim 3, wherein each dipole centerline is disposed at a non-zero angle with respect to the slot centerline of the respective one of the slots.

* * * * *